United States Patent [19]

Sandström

[11] Patent Number: 4,614,838

[45] Date of Patent: Sep. 30, 1986

[54] EDGING, PREFERABLY A SKIRTING-BOARD

[76] Inventor: Rolf I. Sandström, Kamrersvägen 15, Bjärred, Sweden, 237 00

[21] Appl. No.: 558,766

[22] Filed: Dec. 6, 1983

Related U.S. Application Data

[63] Continuation of Ser. No. 279,989, Jun. 17, 1981, abandoned.

[30] Foreign Application Priority Data

Nov. 1, 1979 [SE] Sweden ............................. 7909058

[51] Int. Cl.[4] .......................... E04F 19/04; H02G 3/04
[52] U.S. Cl. ................................. 174/70 C; 52/287; 52/221; 174/97
[58] Field of Search ................... 52/220, 221; 174/48, 174/95-98; 248/68

[56] References Cited

U.S. PATENT DOCUMENTS

| | | | |
|---|---|---|---|
| 319,998 | 6/1885 | Perkins | 174/97 |
| 737,997 | 9/1903 | Burk | 174/97 |
| 936,639 | 10/1909 | Kirkpatrick | 174/97 |
| 1,444,057 | 2/1923 | Bosley | 174/97 |
| 1,794,102 | 2/1931 | Comins | 52/221 |
| 1,984,355 | 12/1934 | Abbott | 52/221 |
| 1,995,855 | 3/1935 | Lee et al. | 174/48 |
| 3,240,456 | 3/1966 | Hartman | 174/48 |
| 3,818,659 | 6/1974 | Anderson | 52/220 |

FOREIGN PATENT DOCUMENTS

| | | |
|---|---|---|
| 977878 | 11/1950 | France . |
| 1346593 | 11/1963 | France . |
| 1463382 | 11/1966 | France . |

*Primary Examiner*—Ramon S. Britts
*Assistant Examiner*—Cherney S. Lieberman
*Attorney, Agent, or Firm*—Saidman, Sterne, Kessler & Goldstein

[57] ABSTRACT

An edging, preferably a skirting-board, in one flat side of which at least one longitudinal groove is provided.

The edging according to the present invention is characterized in that the groove or grooves (2, 3) is outwardly open and ends in the flat side directed outwards when the edging is positioned e.g. at a wall, wherein the distance between the upper and lower boundary surfaces of the groove or grooves is so dimensioned, that between these surfaces a flex (4, 5) of an electrical appliance is from outside directly insertable over an arbitrary length of the edging.

6 Claims, 1 Drawing Figure

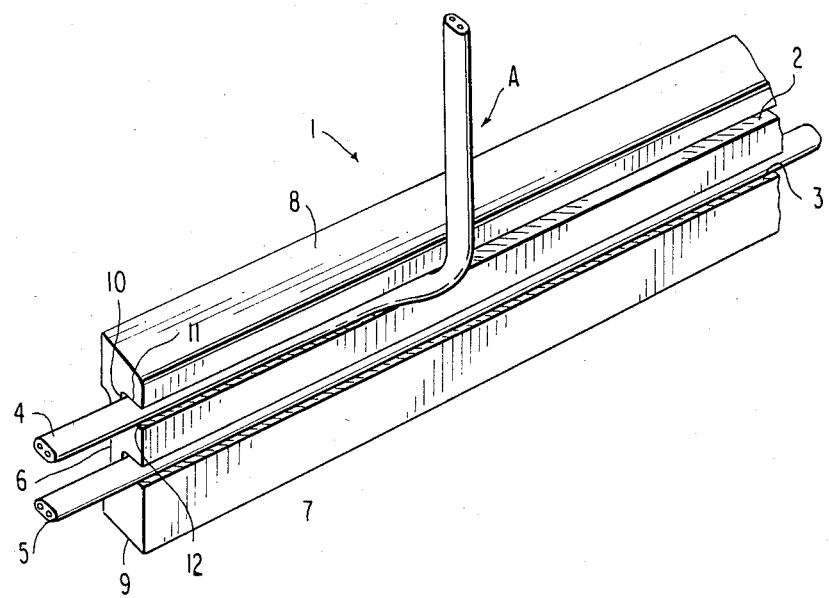

EDGING, PREFERABLY A SKIRTING-BOARD

This application is a continuation of application Ser. No. 279,989, filed June 17, 1981, now abandoned.

The present invention relates to an edging, preferably a skirting-board, which enables separate flexible cords to be received therein.

It is previously known to dispose electric cables for example in recesses at the back of a skirting-board. This means that the cables must be placed behind the edging before fixing it to the wall. It is also known to provide grooves in a countersunk portion at the front of the edging, said grooves then being covered with a small edging. These previously known arrangements do not permit any rapid and simple insertion of separate flexible cords in the edging after positioning and fixing it to a wall. These known arrangements relate to permanent installation of electric cables which are thus not adapted for removal from the groove for connection to an electrical apparatus. By electrical apparatus is meant telephones, loudspeakers, electrical appliances or the like. A usual method of fixing flexible cords along a wall involves stapling the cord to the top of a skirting-board, which involves a risk of damaging the protective covering of the flex by accidental hammering or even that the nail is driven through the protective covering and into the current-conducting flex.

The object of the present invention is thus to provide an edging in which a separate flexible cord can easily be inserted and kept in position and which enables a portion of the flex to be deflected from the groove at an arbitrary point for connection to an electrical apparatus.

According to the present invention this is achieved by giving the edging the characteristic features set out in the claims.

By providing at least one outwardly open groove in the external flat side of the edging, a detachable reception of a flex between a plug and an electrical apparatus is obtained.

The groove may appropriately be dimensioned so that the flex received therein is kept in position in the groove with a light press fit.

The groove may also have a depth exceeding its width, which means that on deflecting a flex, the width of which exceeds its thickness, the flex is firmly gripped as a result of the flex tending to twist in the groove.

The invention will now be described with reference to an illustrative embodiment, the FIGURE illustrating a skirting-board in a perspective view, with flexes inserted in its grooves.

The skirting-board 1 is substantially rigid and is shown with two grooves 2 and 3, having flexes 4 and 5 inserted therein. Flexes 4 and 5 have predetermined cross sectional dimensions, and the width of each flex is juxtaposed along the depth of its respective groove. The upper flex 4 is deflected from the groove 2 at A, while the flex 5 is shown inserted in the groove 3 for deflection to a plug or an electrical apparatus not shown.

More particularly, the edging 1 includes a back wall 6 adapted to be positioned adjacent a wall of a room, a front wall 7 spaced from the back wall 6, and opposed top and bottom walls 8 and 9, respectively, that connect front wall 7 and back wall 6.

The elongated grooves 2 and 3 are formed in front wall 7 of edging 1 for receiving and retaining flexible electrical cables 4 and 5 therein, respectively, without having a cover of any kind thereover. Each of the grooves 2 and 3, such as elongated groove 2, has a bottom wall 10 positioned between front wall 7 and back wall 6 of edging 1, and opposed, spaced side walls 11 and 12 extending between the bottom wall 10 and the front wall 7 of edging 1.

The groove 2 is at all times fully open between its opposed side walls 11 and 12 to expose cable 4, and to enable the cable to be readily inserted and removed therefrom, as stated previously.

The distance between the opposed side walls 11 and 12 is such as to lightly press fit the cable 4 therebetween and to permit cable 4 to be flexibly routed out of groove 2 either upwardly or downwardly at any position along the groove 2, such as at position A.

The invention is not limited to the illustrative embodiment, but modifications can be made within the scope of the following patent claims. Thus, the invention is not restricted to a skirting-board but may consist of a moulding or window-frame etc.

I claim:

1. In combination:
   a flexible cable of predetermined cross sectional dimensions, having a width exceeding its thickness; and
   a substantially rigid edging having a back wall, a front wall spaced from said back wall, and opposed top and bottom walls connecting said front wall and said back wall;
   said edging having at least one groove formed in its front wall receiving and retaining said flexible cable therein without having a cover thereover, said at least one groove having a bottom wall positioned between said front wall and said back wall, and opposed, spaced side walls extending between said bottom wall and said front wall of said edging;
   said at least one groove being fully open between said opposed side walls exposing said cable and enabling said cable to be readily inserted and removed therefrom;
   said groove having a depth exceeding its width, said flexible cable of predetermined cross sectional dimensions being received within said groove with the width of said cable juxtaposed along the depth of said groove and being retained therein with a light press fit thereby permitting said cable to be flexibly routed out of said groove either upwardly or downwardly at an arbitrary point along said groove, whereby when said cable is routed out of said groove, said cable tends to twist in said groove and is gripped by said groove as a result.

2. The combination as set forth in claim 1, wherein said edging comprises a skirting board.

3. The combination as set forth in claim 1, further comprising a second groove formed in said front wall of said edging receiving and retaining a second flexible cable therein without having a cover thereover.

4. The combination as set forth in claim 3, wherein said second groove is substantially identical to said at least one groove and is parallel thereto.

5. The combination as set forth in claim 1, wherein said front wall of said edging is flat.

6. The combination as set forth in claim 1, wherein said opposed, spaced side walls of said groove are parallel to each other.

* * * * *